US009969508B2

(12) United States Patent
Szeto

(10) Patent No.: US 9,969,508 B2
(45) **Date of Patent: *May 15, 2018**

(54) AIRCRAFT LRU DATA COLLECTION AND RELIABILITY PREDICTION

(71) Applicant: Honeywell International Inc., Morris Plains, NJ (US)

(72) Inventor: Roland Szeto, Seattle, WA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/378,601

(22) Filed: Dec. 14, 2016

(65) Prior Publication Data

US 2017/0088290 A1 Mar. 30, 2017

Related U.S. Application Data

(62) Division of application No. 14/636,883, filed on Mar. 3, 2015, now Pat. No. 9,550,583.

(51) Int. Cl.
*G07C 5/00* (2006.01)
*B64F 5/60* (2017.01)
(Continued)

(52) U.S. Cl.
CPC .............. *B64F 5/60* (2017.01); *G05B 13/026* (2013.01); *G07C 5/008* (2013.01); *G07C 5/0808* (2013.01)

(58) Field of Classification Search
USPC ........................................................ 701/31.4
See application file for complete search history.

(56) References Cited

U.S. PATENT DOCUMENTS 5,590,044 A 12/1996 Buckreub
5,931,877 A 8/1999 Smith et al.
(Continued)

FOREIGN PATENT DOCUMENTS

EP 2266880 A1 12/2010
EP 2597602 A1 5/2013
WO 01015001 A2 3/2001

OTHER PUBLICATIONS

Extended Search Report from counterpart European Application No. 16156364.8, dated Jul. 26, 2016, 7 pp.
(Continued)

*Primary Examiner* — Tyler Paige
(74) *Attorney, Agent, or Firm* — Shumaker & Sieffert, P.A.

(57) ABSTRACT

A remote computing system is described that includes at least one processor and at least one module. The at least one module is operable by the at least one processor to receive first operational data collected by a first line-replaceable-unit of a first aircraft during flight operations of the first aircraft, and receive second operational data collected by at least one second line-replaceable-unit of at least one second aircraft during flight operations of the at least one second aircraft. The at least one module is further operable by the at least one processor to predict, based at least in part on the first operational data and the second operational data, a failure condition associated with the first line-replaceable-unit of the first aircraft, and output, based on the impending failure condition, an indication of the predicted failure condition.

20 Claims, 5 Drawing Sheets

1
5B – 5N
LRU 10B – 10N
GROUND STATIONS 30B - 30N
5A
LRU 10A
REMOTE FAULT DETECTION SYSTEM 40
GROUND STATION 30A

(51) Int. Cl.
*G07C 5/08* (2006.01)
*G05B 13/02* (2006.01)

(56) References Cited

U.S. PATENT DOCUMENTS 6,047,165 A 4/2000 Wright et al.
6,385,513 B1 5/2002 Murray et al.
6,603,424 B1 8/2003 Abatzoglou
6,891,496 B2 5/2005 Husted et al.
7,356,336 B2 4/2008 Perez et al.
7,393,248 B2 * 7/2008 Best .................... H05K 7/1457 439/638
7,576,695 B2 8/2009 Smith et al.
7,633,430 B1 12/2009 Wichgers et al.
7,689,594 B2 * 3/2010 Davidson ............ G05D 1/0077 701/1
7,908,042 B2 3/2011 Brinkley et al.
8,244,414 B2 8/2012 Fok et al.
8,335,601 B2 12/2012 Sham et al.
8,433,458 B2 4/2013 Hiale-Guilhamou et al.
8,433,475 B2 4/2013 Corbefin
9,137,038 B1 * 9/2015 Mazuk .................... G06F 11/14
9,550,583 B2 * 1/2017 Szeto .................... G07C 5/008
2004/0078123 A1 4/2004 Igloi
2004/0176887 A1 9/2004 Kent
2005/0148327 A1 7/2005 Perez et al.
2005/0187677 A1 8/2005 Walker
2006/0167598 A1 7/2006 Pennarola
2007/0027655 A1 2/2007 Schmidt
2007/0112576 A1 5/2007 Avery
2007/0124222 A1 5/2007 Avery
2007/0124223 A1 5/2007 Avery
2009/0112569 A1 4/2009 Angus
2009/0172080 A1 7/2009 Pandit
2009/0192668 A1 7/2009 Payne
2010/0100259 A1 * 4/2010 Geiter .................... G06N 5/045 701/3
2010/0125468 A1 * 5/2010 Avery .................... G06Q 10/06 701/29.3
2013/0274991 A1 10/2013 Cheriere
2013/0274992 A1 * 10/2013 Cheriere ............... B64F 5/0081 701/32.9
2014/0380433 A1 12/2014 Yerger et al.
2017/0088290 A1 * 3/2017 Szeto ........................ B64F 5/60

OTHER PUBLICATIONS

Response to Extended Search Report dated Jul. 20, 2016, from counterpart European Application No. 16156364.8, filed Nov. 11, 2016, 15 pp.

"Operational Use of Downlink Airborne Parameters—High Level Considerations," Eurocontrol, www.eurocontrol.int, Sep. 2012, 16 pp.

Prosecution History from U.S. Appl. No. 14/636,883, dated Feb. 22, 2016 through Sep. 14, 2016, 38 pp.

Examination Report from counterpart European Application No. 16156364.8, dated Feb. 13, 2018, 4 pp.

* cited by examiner

AIRCRAFT LRU DATA COLLECTION AND RELIABILITY PREDICTION

This application is a Divisional of application Ser. No. 14/636,883, filed on Mar. 3, 2015, the entire content of which is hereby incorporated by reference.

BACKGROUND

A line-replaceable-unit (LRU) is a modular component of an aircraft that is replaceable in the field or at an operating station (e.g., a hanger) that is otherwise remote from a manufacturing facility, a maintenance depot, or other maintenance location. Some LRUs perform operational fault testing and store the results as fault data in non-volatile memory that can later be retrieved by a technician for further analysis. Most fault data only provides an indication of whether the LRU passed a particular test, without much, if any contextual information about the LRU, at the time of the test. The fault data may only be retrievable from the non-volatile memory of some LRUs, by a technician, using specialized equipment either on board the aircraft (e.g., after a pilot complaint) or at a maintenance location (e.g., after the LRU has been removed from the aircraft). As such, LRU fault data is typically not easily obtainable and may only be of limited use in performing fault isolation without providing much insight into why a fault may have occurred.

SUMMARY

In general, circuits and techniques are described for enabling an aircraft LRU to collect operational data, specific to the LRU, which may be used by ground system for determining why the LRU failed in the past or even for predicting when the LRU may fail in the future. The ground system may compare the data collected by one LRU to determine when other similar LRUs, installed in other aircraft, may fail. The LRU may provide the operational data automatically to the ground system (i.e., without user intervention) to build a complete operational history specific to one or many LRUs. The ground system may utilize the operational history of one or several LRUs to determine causes of past failures or predict occurrences of future failures.

In one example, the disclosure is directed to a method for determining failure conditions associated with aircraft installed line-replaceable-units. The method includes receiving, by a remote computing system, first operational data collected by a first line-replaceable-unit of a first aircraft during flight operations of the first aircraft, and receiving, by the remote computing system, second operational data collected by at least one second line-replaceable-unit of at least one second aircraft during flight operations of the at least one second aircraft. The method further includes predicting, by the remote computing system, based at least in part on the first operational data and the second operational data, a failure condition associated with the first line-replaceable-unit of the first aircraft. The method further includes outputting, by the remote computing system, an indication of the failure condition.

In another example, the disclosure is directed to a remote computing system for determining failure conditions associated with aircraft installed line-replaceable-units. The remote computing system includes at least one processor; and at least one module operable by the at least one processor to: receive first operational data collected by a first line-replaceable-unit, installed onboard a first aircraft, during flight operations of the first aircraft, and receive second operational data collected by at least one second line-replaceable-unit, installed onboard at least one second aircraft, during flight operations of the at least one second aircraft. The at least one module operable by the at least one processor to predict, based at least in part on the first operational data and the second operational data, a failure condition associated with the first line-replaceable-unit, and output, an indication of the failure condition.

In another example, the disclosure is directed to a method that includes during flight operations of the aircraft, automatically collecting, by a line-replaceable-unit of the aircraft, operational data associated with the line-replaceable-unit, and responsive to determining that the aircraft has landed, automatically establishing, by the line-replaceable-unit, a communication session with a ground station. The method further includes automatically outputting, by the line-replaceable-unit, to a ground station, the operational data via the communication session for subsequent transmission to a remote computing system configured to predict, based on the operational data, one or more failure conditions associated with the line-replaceable-unit.

The details of one or more examples are set forth in the accompanying drawings and the description below. Other features, objects, and advantages of the disclosure will be apparent from the description and drawings, and from the claims.

DETAILED DESCRIPTION

In general, circuits and techniques are described for enabling a line-replaceable-unit (LRU), installed on board an aircraft, to output operational data collected by the LRU during flight. A ground station may receive the operational data from the LRU automatically, each and every time the aircraft lands. In some examples, the operational data is output from a LRU via a wireless communication link established between the LRU and the ground station, each time the aircraft lands. Overtime, the operational data collected by the LRU may provide the ground station with a fault and/or flight history associated with the LRU that can be used to identify, predict, and prevent operational failures associated with the LRU.

In some examples, the ground station may output the operational data, or a subset thereof, to a remote computing system that also obtains operational data collected by other similar LRUs from other aircraft. The remote computing system may process and analyze the operational data collected from multiple LRUs to identify patterns in the operational data. Identifying patterns in operational data collected by multiple LRUs may enable the remote computing system to perform root-cause-analysis associated with a failure encountered on a specific LRU and/or predict future operational failures associated with all the other LRUs that are operating in the field. In addition, the operational data can be used to improve the effectiveness of a built-in-test function of the LRU to better self-identify failures or impending failures.

Since the operational data is obtained wirelessly by the ground station automatically each time the aircraft lands, no personnel need to hook up to the aircraft using specialized equipment or board the aircraft after the aircraft has landed on the ground. Rather than wait for a fault to occur, the operational data can be continuously monitored to provide detailed fault prediction and fault isolation/root cause analysis. Major failures may be prevented by performing constant monitoring and analysis of the operational data. As a result, a LRU may be cheaper to maintain and have better reliability and effectiveness in the field.

Figure 1:
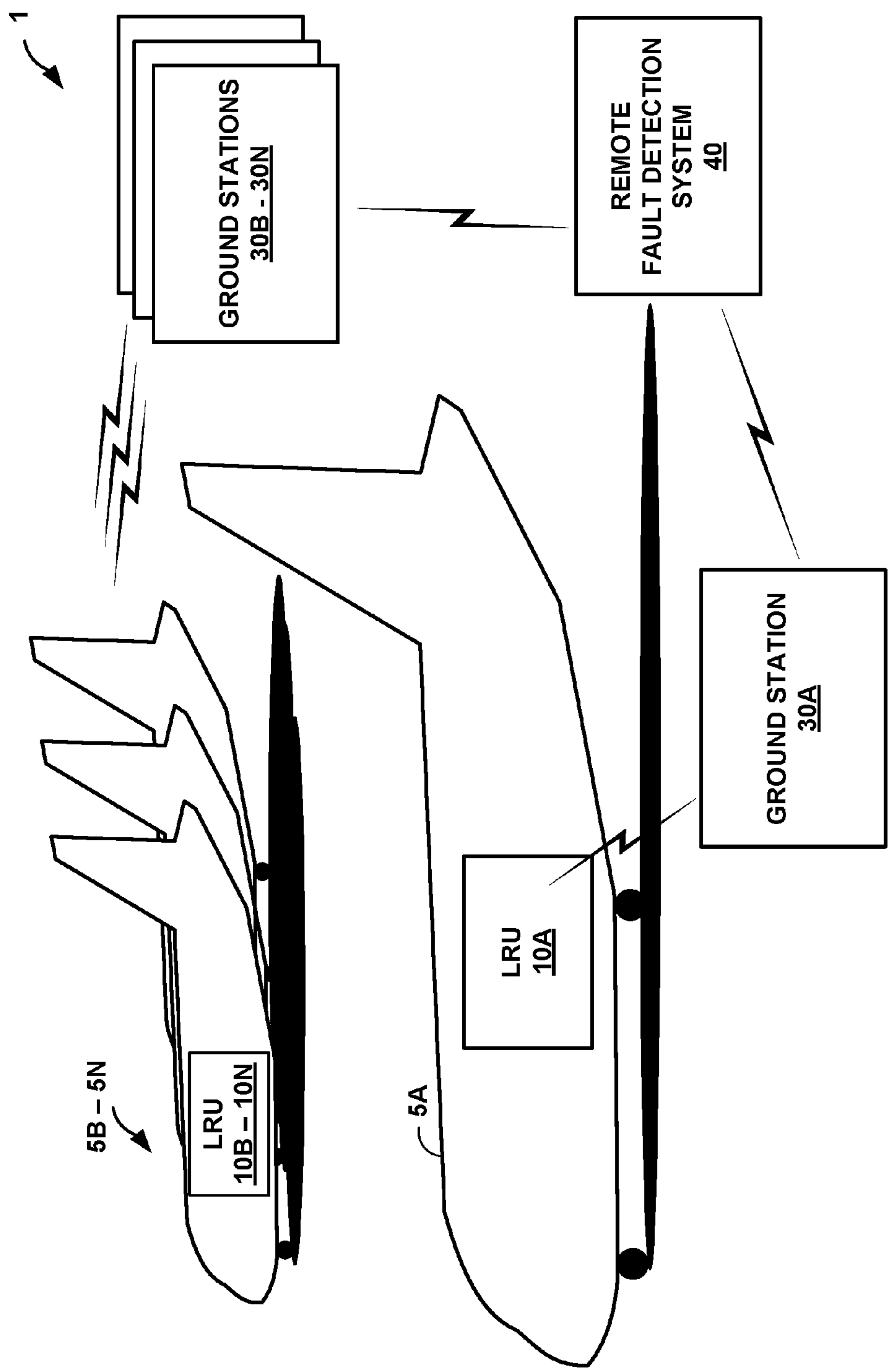
FIG. 1 is a conceptual diagram illustrating a system that includes multiple aircraft, each with a respective line-replaceable-unit configured to output operational data used to predict failure conditions, in accordance with one or more aspects of the present disclosure.

FIG. 1 is a conceptual diagram illustrating system 1 which includes multiple aircraft 5A-5N, each with a respective line-replaceable-unit 10A-10N configured to output operational data used to predict failure conditions, in accordance with one or more aspects of the present disclosure.

System 1 includes multiple aircraft 5A-5N (collectively “aircraft 5”) that each has at least one respective, line-replaceable-unit 10A-10N (collectively “LRUs 10”). System 1 further includes multiple ground stations 30A-30N (collectively “ground stations 30”) in communication with each of LRUs 10. System 1 further includes remote fault detection (RFD) system 40 in communication with each of ground stations 30. In some examples, each of ground stations 30 may correspond to one LRU 10. In other examples, ground stations 30 may be shared between multiple LRUs 10. In another example, ground station 30 may be shared between multiple types of LRU 10.

For ease of description, FIG. 1 is primarily described from the perspective of aircraft 5A, LRU 10A, and ground station 30A. However, the following techniques and description are likewise applicable to each of aircraft 5B-5N, LRU 10B-10B, and ground stations 30B-30N.

Ground station 30A may include or be separate from RFD system 40. That is, ground station 30A may include all the components and/or functionality of RFD system 40.

In general, the primary purpose of ground station 30A is to obtain the operational data collected by LRU 10A after aircraft 5A lands on the ground. Once the operational data is collected, ground station 30A may analyze the operational data to determine whether any faults associated with LRU 10A have occurred or are likely to occur in the near future. In the event that a ground fault has or is about to occur, ground station 30A may output (e.g., at a graphical user interface) information for a maintenance person to review in order to take action to remedy the fault. In some examples, ground station 30A acts as a conduit for the operational data to travel to RFD system 40.

RFD system 40 may gather operational data collected by multiple LRUs 10 and analyzes the data to identify patterns indicating actual and/or potential failures associated with LRUs 10. For example, ground station 30A may output operational data collected by LRU 10A to RFD system 40 via a wired or wireless communication link established between ground station 30A and RFD system 40. In some examples, the communication link established between ground station 30A and RFD system 40 is based on internet protocol, Wi-Fi, short wave, long wave, or any other form of radio communication for facilitating the transfer of data from one computing system to another.

In response to outputting the operational data, ground station 30A may receive an indication of predicted failure condition associated with one of LRUs 10 and/or an indication of remedial action that a maintenance person should take to prevent or remedy the predicted failure condition (including maintenance or replacement of that one of LRUs 10). Ground station 30A and RFD system 40 are described in greater detail below and with respect to the additional FIGS.

By definition, LRU 10A represents a component or a subcomponent of aircraft 5A that can generally be replaced quickly and cheaply (e.g., with a minimum of tools) in the field. Examples of LRU 10A include, but should not be limited to, a radar system, an onboard computer system, a terrain and traffic collision avoidance system, communication radio, an engine, an engine controller, a flight management system, a radio altimeter, a navigation system, a flight warning computer, or any subcomponent of any of the above.

By being line-replaceable, LRU 10A may enable maintenance of aircraft 5A to occur on the “flight line” by swapping out LRU 10A when LRU 10A becomes defective and replacing LRU 10A with a functional (i.e., working) copy rather than having to undergo a lengthy or complex repair process to restore functionality of LRU 10A. In this way, maintenance associated with aircraft 5A can occur more quickly out on the flight line rather than wasting time and/or money moving aircraft 5A into a maintenance facility that is capable of repairing LRU 10A.

In some examples, LRU 10A is disposable after being replaced in the field. For example, in some examples, LRU 10A includes electronic components (e.g., semiconductors, complex multilayer printed circuit boards, and the like) that cannot be taken apart or easily repaired. In other examples, LRU 10A may be designed to be shipped to a factory or maintenance depot maintenance for overhaul. For instance, in some examples, LRU 10A is designed for to operate in a severe environment (e.g., in flight) and therefore may require periodic, routine maintenance checks and reconditioning. To simplify supply maintenance across different types of aircraft, in some examples, LRU 10A is a standardized component that can be installed in different types of aircraft. For example, a power supply for an aircraft computer system may be compatible with several different types of onboard computer systems of several different types of aircraft.

During flight operations of aircraft 5A (or whichever one of aircraft 5 in which LRU 10A is installed), LRU 10A is configured to automatically collect operational data associated with LRU 10A. For example, LRU 10A may include one or more modules and sensors that automatically collect data about the operating conditions and changes in various parameter values that LRU 10A undergoes during each flight of aircraft 5A. Operational data can include information pertaining to any parameter or environmental condition associated with the operating environment of LRU 10A during each flight of aircraft 5A. The operational data collected by LRU 10A may not in itself provide an indication that a failure condition is occurring or is about to occur, however the operational data, when compared with operational data collected by other LRUs 10 and/or expected values, may provide an indication that a subsystem or component of LRU 10A is failing or is about to fail.

In some examples, the operational data collected by LRU 10A may include one or more operational parameters being monitored by a built-in-test (BIT) module of LRU 10A. In other examples, operational data collected by LRU 10A may include information pertaining to: temperature and durations of time that LRU 10A and various subcomponents thereof are operational. In some examples, the operational data collected by LRU 10A may include input, output, and other types of voltage or current levels and associated fluctuations in the levels, associated with LRU 10A and various subcomponents thereof. In some examples, the operational data collected by LRU 10A may include information pertaining to a speed, an amount of drift, or an accuracy associated with a motor of LRU 10A. In some examples, the operational data collected by LRU 10A may include information pertaining to temperatures and amount of thrust associated with an engine of LRU 10A.

In some examples, the operational data collected by LRU 10A may include information pertaining to "single event upsets" experienced by LRU 10A. A single event upset is a change of state caused by ions or electro-magnetic radiation (e.g., typically observed in the Earth's atmosphere) striking a sensitive node in a micro-electronic device, such as an LRU, a microprocessor thereof, semiconductor memory thereof, power transistors thereof, other component or subcomponent of an LRU. The state change is caused by free charge from ionization that occurs in or near to logic element of the LRU (e.g., a memory cell). These state changes can sometimes cause "soft" errors that negatively affect the performance of the LRU without necessarily being identifiable as a cause. Often, a "soft" error may be observed (e.g., in the cockpit) as a mere temporary glitch or other anomaly that if not reported, goes unrecorded. Soft errors can cause observable errors in operation of an LRU that if not detected and recorded as being a result of one or more single event upsets, can prevent adequate root cause analysis and investigation. In some examples, the operational data collected by LRU 10A may include a time, altitude and/or quantity of single event upsets detected during flight as well as whether a particular single event upset: led to any memory errors, caused recoverable failures, and caused non-recoverable failures (e.g., that were reported to a pilot).

In any event, responsive to determining that aircraft 5A has landed, LRU 10A may automatically establish a communication session with ground station 30A. For example, LRU 10A may receive information from an onboard computer associated with aircraft 5A that indicates when a "weight-on-wheels" condition occurs after aircraft 5A has landed. In some examples, LRU 10A may analyze internal sensor information to discern when aircraft 5A has landed.

Upon determining that aircraft 5A has landed, LRU 10A may determine that operational data collected during flight can safely and reliably be output without interfering with other electronic systems of aircraft 5A and establish a wireless communication link to handle the transfer of the operational data to ground station 30A and/or RFD system 40. For example, LRU 10A, ground station 30A, and RFD system 40 may each include a Wi-Fi radio transmitter and receiver or any other type of radio transmitter and receiver configured to wirelessly transmit and receive data.

In some examples, ground station 30A may initiate the communication link upon detecting LRU 10A being in range of a transmitter of ground station 30A. In some examples, LRU 10A may initiate the communication link upon detecting ground station 30A and/or RFD system 40 being in range of the radio of LRU 10A.

In any event, after a communication link between LRU 10A and ground station 30A is established, LRU 10A may automatically output, to ground station 30A, the operational data via the communication session for subsequent transmission to RFD system 40 which is configured to predict, based on the operational data, one or more failure conditions associated with LRU 10A.

After aircraft 5 have landed, RFD system 40 may receive first operational data collected by LRU 10A during flight operations of aircraft 5A and may further receive second operational data collected by at least one second LRU of LRUs 10B-10N during flight operations of at least one second aircraft of aircraft 5B-5N. For example, each of ground stations 30 may establish respective communication links with LRUs 10. LRUs 10 may output the operational data collected during flight of aircraft 5. The operational data, or a subset thereof, may pass from LRUs 10 either in raw form or in manipulated form (e.g., filtered to remove anomalies, etc.) to RFD system 40.

Based on the operational data collected by LRUs 10, RFD system 40 may predict a failure condition associated with LRU 10A. RFD system 40 may output, based on the impending failure condition, an indication of the predicted failure condition.

For example, RFD system 40 may simultaneously process the operational data collected by LRUs 10 to determine trends in the data that lead up to actual failure conditions observed with at least some of LRUs 10. By gathering the operational data collected by multiple LRUs 10 over time, RFD system 40 can build a flight history associated with each individual one of LRUs 10 and the entire fleet of LRUs 10.

RFD system 40 may identify trends or patterns in the operation data, RFD system 40 can use the trends and patterns to predict when an LRU is going to fail. For instance, RFD system 40 may determine that an LRU that has not yet failed, but has collected data that matches a pattern for failure, may likely fail in the future. RFD system 40 may output information (e.g., a message, an e-mail, a report, or other types of data) to the ground station associated with the failing LRU so as to indicate to a maintenance person associated with the failing LRU that the failure condition is likely to occur.

From a graphical user interface or other user interface associated with ground stations 30 and/or RFD system 40, flight line maintenance personnel and/or other personnel, may determine when to replace LRUs 10 before they actually fail. In addition, a manufacturer or LRUs 10 may retain the operational data to determine root cause analysis and product enhancement/redesign to improve future LRUs and to make future versions of LRUs 10 more tolerant and fault resistant.

By wirelessly linking LRUs 10, via ground stations 30, to RFD system 40, system 1 may provide an operational flight history of each and every LRUs 10. The operational flight history can be maintained by RFD system 40 to enable faults to be predicted, and preventive action to be recommended, before a major failure of an LRU occurs. As such the availability and reliability of each of LRUs 10 may increase.

Furthermore, the flight history and operational data may be used by other systems, for example, to aid in the development and improvement of internal, built-in-test (BIT) functionality and systems of each of LRUs 10.

Figure 2:
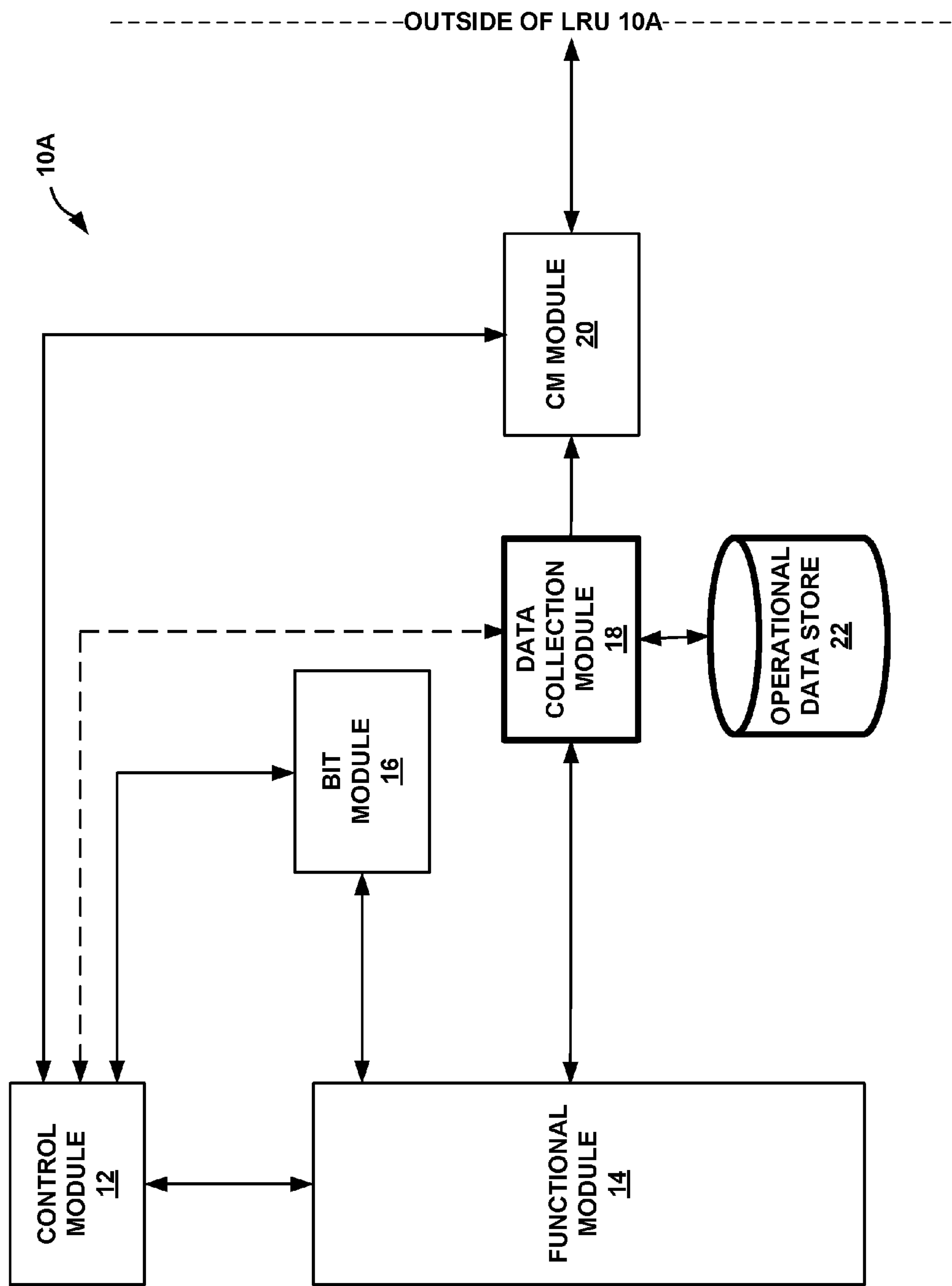
FIG. 2 is a block diagram illustrating an example line-replaceable-unit configured to output operational data used to predict failure conditions, in accordance with one or more aspects of the present disclosure.

FIG. 2 is a block diagram illustrating LRU 10A configured to output operational data used to predict failure conditions, in accordance with one or more aspects of the present disclosure. LRU 10A is described below within the context of system 1 of FIG. 1.

LRU 10A represents a component or a subcomponent of aircraft 5A from FIG. 1 that can generally be replaced quickly and cheaply (e.g., with a minimum of tools) in the field. FIG. 2 shows LRU 10A having control module 12, functional module 14, built-in-test (BIT) module 16 (also referred to as a central maintenance computer "CMC"), data collection module 18, communication management (CM) module 20, and operational data store 22.

Modules 12-20 can comprise any suitable arrangement of hardware, software, firmware, or any combination thereof, to perform the techniques attributed to modules 12-20 herein. For example, modules 12-20 may include any one or more microprocessors, digital signal processors (DSPs), application specific integrated circuits (ASICs), field programmable gate arrays (FPGAs), or any other equivalent integrated or discrete logic circuitry, as well as any combinations of such components. When modules 12-20 include software or firmware, modules 12-20 further include any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 2, modules 12-20 may include a memory configured to store data. The memory may include or be separate from operational data store 22. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to modules 12-20 and/or LRU 10A, e.g., may be external to a package in which modules 12-20 and/or LRU 10A are housed.

Control module 12 provides command and control signals to the other components of LRU 10A for causing LRU 10A to perform a function. For example, LRU 10A may be a radar system on board aircraft 5A and control module 12 may cause or otherwise configure functional module 14 to perform operations related to radar tracking and surveillance. Control module 12 has a direct communication link with modules 14, 16, and 20. FIG. 2 shows control module 12 having an optional direct communication link with data collection module 18. In some examples, control module 12 may provide command and control signals to data collection module 18 for configuring data collection module 18 to collect operational data associated with LRU 10A during flight of aircraft 5A. In other examples, data collection module 18 may operate independently from control module 12 to collect operational data associated with LRU 10A during flight of aircraft 5A despite whatever operations may be performed by control module 12 and the other modules 14, 16, and 20.

Various examples of functional module 14 exist and are too numerous to describe. In general, functional module 14 is any logical block of hardware, software, and/or firmware configured to perform the functional operations associated with LRU 10A that are separate and distinct from the operations of modules 12, 16, 18, and 20. For example, in cases where LRU 10A is a radar system, functional module 14 may include the components necessary for performing radar tracking and surveillance operations, such as a radar antenna, transmitter, receiver, mixer, power supply, and other components of a radar. In cases where LRU 10A is a radio, functional module 14 may include the components necessary for performing radio communications, such as a radio antenna, transmitter, receiver, power supply, and other components of a radio.

BIT module 16 performs built-in test operations associated with LRU 10A. For example, BIT module 16 may periodically and/or upon receiving a command from control module 12, execute a series of tests on functional module 14 to determine whether functional module 14 is correctly performing the operations of LRU 10A. BIT module 16 may provide a series of inputs to functional module 14 and compares the outputs received from functional module 14 in response to the inputs, to one or more expected results. If the outputs received in response to the inputs differ from the expected results, BIT module 16 may generate an interrupt or send a flag to control module 12 indicating that LRU 10A has failed a test. Control module 12 may relay the flag to the cockpit of aircraft 5A (e.g., for display at a BIT test page of a graphical user interface, as an audible alert, or other type of notification).

CM module 20 represents the communication interface between LRU 10A and other components that reside outside of LRU 10A. For example, CM module 20 may transmit and receive data to and from other components of aircraft 5A (e.g., via a shared communication bus). CM module 20 may transmit and receive data to and from a test bench when a test station is plugged into LRU 10A (e.g., at a maintenance depot or on the flight line).

In accordance with techniques of this disclosure, CM module 20 may be configured to establish a communication session with ground station 30A and/or RFD system 40. CM module 20 may utilize any suitable wireless transmission technique to establish the communication session with ground station 30A and/or RFD system 40. For instance, in some examples CM module 20 includes a Wi-Fi radio that searches for a Wi-Fi network (e.g., at an airport) at which ground station 30A is connected.

In some examples, utilizing a push system, CM module 20 may scan for ground stations 30 after aircraft 5A lands and once CM module 20 detects ground station 30A, CM module 20 may initiate communication link with ground station 30A so that LRU 10A can transfer operational data collected during the previous flight(s). In an alternative way, by utilizing a pull system, CM module 20 may wait until ground stations 30A tries to initiate a communication link with LRU 10A after aircraft 5A lands so that ground stations 30A can obtain the operational data collected by LRU 10A during the previous flight(s).

Operational data store 22 represents a memory or other information repository at which data collection module 18 stores and retrieves operational data collected during flight of aircraft 5A. For example, operational data store 22 may be a memory, a disk, or other non-volatile, non-transitory, computer-readable storage medium configured to store data before and after aircraft 5A has landed. Operational data store 22 may arrange the operational data based on time and/or category.

For example, operational data store 22 may include one or more tables of values of various operational parameters associated with the line-replaceable-unit, times at which each value was measured or detected, and/or other information related to the operational parameters. Some examples of the types of information that operational data store 22 may store include, but are not limited to voltage or current level information, temperature information, motor speed information, engine thrust information, acceleration information, barometric pressure information, single event upsets information, transmission power information, audio level information, humidity level information, or any other type of information that may be useful for predicting failure conditions associated with a line-replaceable-unit. For instance, operational data store 22 may generate a data base of each single event upset detected by data collection module 18, a corresponding time of each single event upset, and other information, such as whether the single event upset caused a recoverable or non-recoverable memory error. Whether the single event upset caused a recoverable or non-recoverable memory error may help a manufacturer of LRU 10A determine whether an observed fault was caused by single event upsets (e.g., atmospheric conditions) or some other discoverable anomaly associated with functional module 14.

Data collection module 18 is configured to collect operational data associated with LRU 10A and manage the transfer of the operational data collected to ground station 30A and/or RFD system 40 for further processing. For example, during flight operations of aircraft 5A, one or more sensors of data collection module 18 may automatically collect data about the operating conditions and changes in various parameter values during each flight of aircraft 5A. Data collection module 18 may include one or more temperature sensors, accelerometers, pressure sensors, voltage or current sensors, speedometers, or any other type of sensor, module, unit, or circuitry configured to measure values of operational parameters described herein.

Operational data collected by LRU 10A may include information pertaining to: temperature and durations of time that LRU 10A and various subcomponents thereof are operational. In some examples, the operational data collected by LRU 10A may include input, output, and other types of voltage or current levels and fluctuations associated fluctuations in the levels, associated with LRU 10A and various subcomponents thereof. In some examples, the operational data collected by LRU 10A may include information pertaining to a speed, an amount of drift, or an accuracy associated with a motor of LRU 10A. In some examples, the operational data collected by LRU 10A may include information pertaining to temperatures and amount of thrust associated with an engine of LRU 10A. Responsive to detecting one or more values of an operational parameter associated with LRU 10A, data collection module 18 may send information and instructions to operational data store 22 for storing the one or more values of the operational parameter as the operational data being collected during flight operations of aircraft 5A.

In any event, responsive to determining that aircraft 5A has landed, data collection module 18 may configure CM module 20 to automatically establish a communication session with ground station 30A. For example, data collection module 18 may receive information from control module 12 that indicates when a "weight-on-wheels" condition occurs after aircraft 5A has landed. In some examples, data collection module 18 may analyze sensor information obtained by sensors of data collection module 18 to discern when aircraft 5A has landed independent of control module 12.

Upon determining that aircraft 5A has landed, data collection module 18 may determine that operational data collected previously during flight can safely and reliably be output without interfering with other electronic systems of aircraft 5A and in response, initiate a wireless communication link, via CM module 20, with ground station 30A to handle the transfer of the operational data to ground station 30A and/or RFD system 40. Data collection module 18 may output the operational data via CM module 20 by retrieving, from operational data store 22, the stored operational data collected during flight and transferring the retrieved operational data to CM module 20 for output via the communication link.

In some examples, ground station 30A may initiate the communication link with LRU 10A upon detecting LRU 10A being in range of a transmitter of ground station 30A. For example, CM module 20 may receive a hand shake request from ground station 30A and relay the query to data collection module 18. Data collection module 18 may acknowledge the hand shake request with ground station 30A and command CM module 20 to initiate the communication link for outputting the operational data.

In any event, after a communication link between data collection module 18 and ground station 30A is established, data collection module 18 may cause CM module 20 to automatically output, to ground station 30A, the operational data retrieved from operational data store 22. Once the operational data leaves LRU 10A, ground station 30A and/or RFD system 40 may analyze the operational data to discern whether any identifiable patterns are present in the operational data that indicate an actual or impending failure condition associated with LRU 10A.

Figure 3:
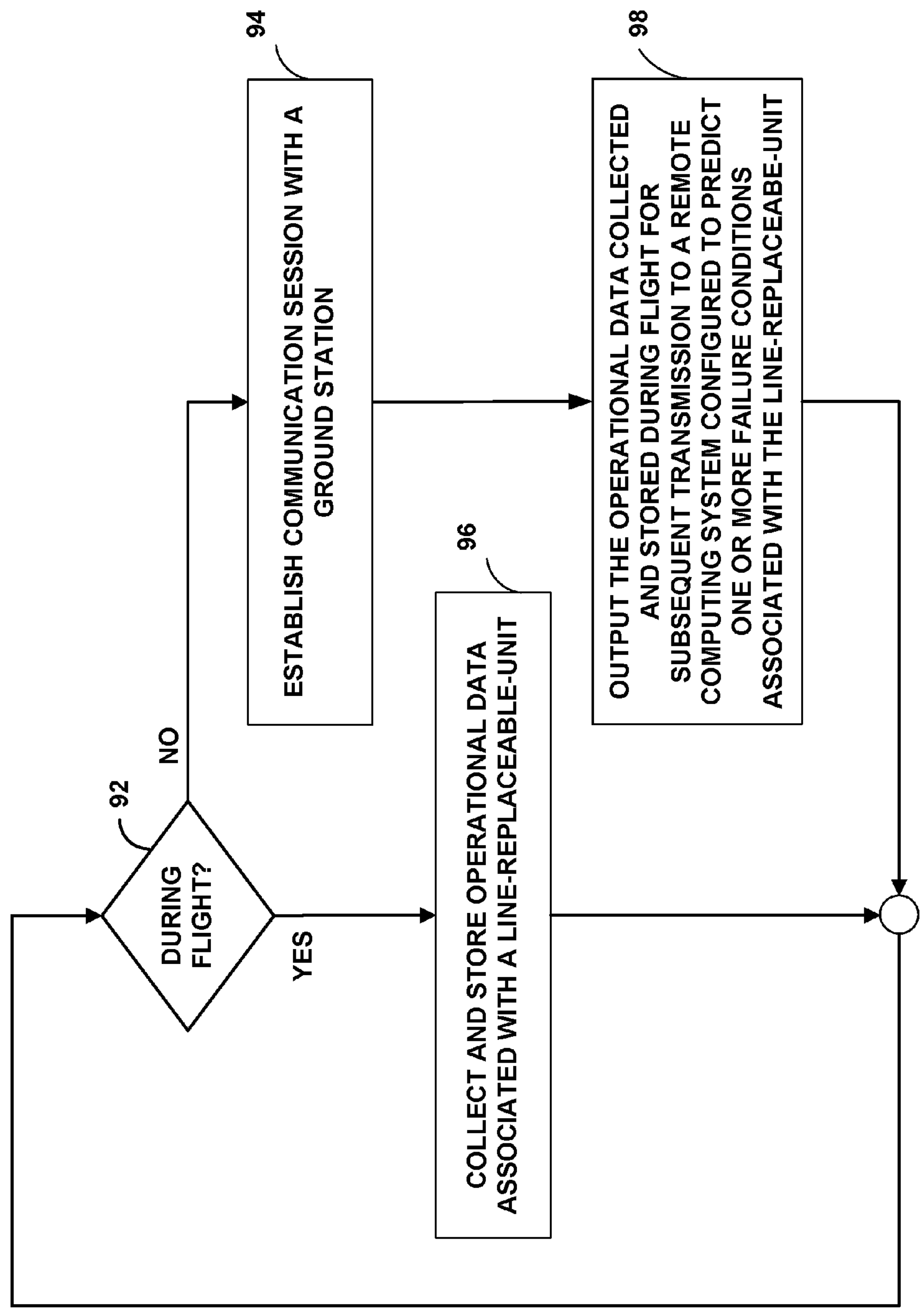
FIG. 3 is a flow chart illustrating example operations of an example line-replaceable-unit configured to collect and output operational data to a remote fault prediction system, in accordance with one or more aspects of the present disclosure.

FIG. 3 is a flow chart illustrating example operations of LRU 10A which is configured to collect and output operational data to a failure condition prediction system, in accordance with one or more aspects of the present disclosure. The operations of FIG. 3 may be performed by modules 12-20 of LRU 10A and are described below in the context of system 1 of FIG. 1 and LRU 10A of FIG. 2.

LRU 10A may determine whether aircraft 5A is currently inflight or whether aircraft 5A has landed (92). For example, data collection module 18 may independently, or upon receiving information from control module 12 and/or functional module 14, determine whether aircraft 5A is flying or whether aircraft 5A has landed.

Upon determining that aircraft 5A is flying, data collection module 18 may collect and store operational data associated with LRU 10A (96). For instance, data collection module 18 may include one or more sensors configured to detect one or more single event upsets. In response to detecting a single event upset, data collection module 18 may cause operational data store 22 to store information recording the occurrence of the single event upsets.

As some examples, data collection module 18 may cause operational data store 22 to record: a time of each, or a range of times, of the one or more single event upsets, a quantity of the one or more single event upsets detected at a particular time or over a time range, an indication of whether each, or any, of the one or more single events upsets triggered a recoverable or non-recoverable memory error associated with a memory of the line-replaceable-unit. Later on, after LRU 10A outputs the operational data to RFD system 40, RFD system 40 may analyze the information associated with the single event upsets to develop a rule for predicting when a failure condition will occur.

In some examples, data collection module 18 may include one or more sensors configured to detect an input voltage or current level associated with LRU 10A and store information associated with the input voltage or current level at operational data store 22. After aircraft 5A lands, and after LRU 10A outputs the operational data to RFD system 40, RFD system 40 may analyze the information associated with the input voltage or currents to predict when a failure condition will occur out in the field of all LRU 10s and/or to determine why a failure was observed by LRU 10A (i.e., the LRU 10 that collected the operational data).

In some examples, data collection module 18 may perform some initial analysis on the operational data being collected before causing operational data store 22 to record the data. For example, data collection module 18 may determine whether a detected input voltage or current level satisfies a threshold level for an acceptable input voltage or current level. Responsive to determining that the input voltage or current level does not satisfy the threshold level, data collection module 18 may store an indication of when and by how much the input voltage or current level deviated from the threshold level. In this way, LRU 10A may discriminately collect some operational data that may have a better chance at predicting failure conditions or reasons for past failures rather than merely collecting all operational data, all the time. In this way, LRU 10A may be able to collect more types of operational data or for a longer period of time, between data dumps to ground station 30A and RFD system 40.

Responsive to determining that aircraft 5A has landed, data collection module 18 may configure CM module 20 to automatically establish a communication session with ground station 30A (94). For example, ground station 30A may initiate a communication link with LRU 10A upon detecting LRU 10A being in range of a transmitter of ground station 30A. CM module 20 may receive a hand shake request from ground station 30A and relay the query to data collection module 18. Data collection module 18 may acknowledge the hand shake request with ground station 30A and command CM module 20 to initiate the communication link for outputting the operational data.

After establishing the communication link between data collection module 18 and ground station 30A, data collection module 18 may cause CM module 20 to automatically output, to ground station 30A, the operational data retrieved from operational data store 22 for subsequent transmission to a remote computing system that is configured to predict one or more failure conditions associated with the LRU (98). Once the operational data leaves LRU 10A, ground station 30A and/or RFD system 40 may analyze the operational data to discern whether any identifiable patterns are present in the operational data that indicate an actual or impending failure condition associated with LRU 10A or other LRUs 10.

Figure 4:
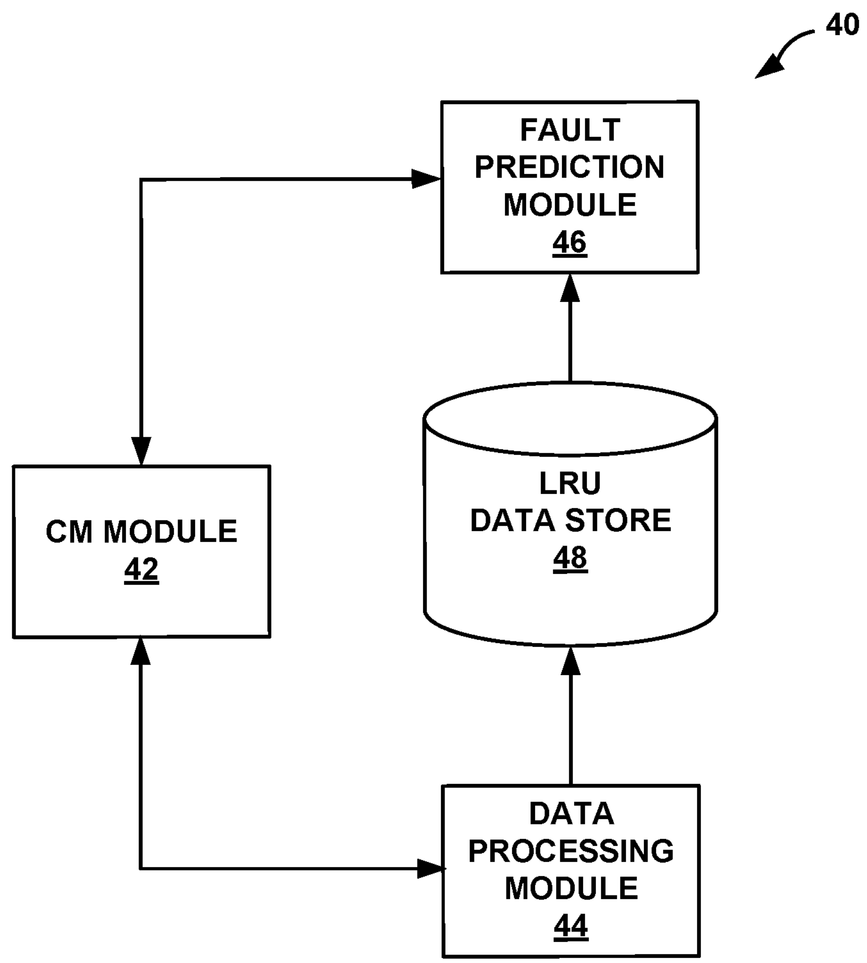
FIG. 4 is a block diagram illustrating an example remote fault prediction system configured to predict failure conditions based on operational data collected by one or more example line-replaceable-units, in accordance with one or more aspects of the present disclosure.

FIG. 4 is a block diagram illustrating RFD system 40 which is configured to predict failure conditions based on operational data collected by LRUs 10, in accordance with one or more aspects of the present disclosure. RFD system 40 is described below within the context of system 1 of FIG. 1 and LRU 10A of FIGS. 1 and 2.

RFD system 40 includes communication management (CM) module 42, data processing (DP) module 44, fault prediction (FP) module 46, as well as LRU data store 48. Modules 42-46 can comprise any suitable arrangement of hardware, software, firmware, or any combination thereof, to perform the techniques attributed to modules 42-46 herein. For example, modules 42-46 may include any one or more microprocessors, DSPs, ASICs, FPGAs, or any other equivalent integrated or discrete logic circuitry, as well as any combinations of such components. When modules 42-46 include software or firmware, modules 42-46 further include any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 4, modules 42-46 may include a memory configured to store data. The memory may include or be separate from LRU data store 48. The memory may include any volatile or non-volatile media, such as a RAM, ROM, NVRAM, EEPROM, flash memory, and the like. In some examples, the memory may be external to modules 42-46 and/or RFD system 40, e.g., may be external to a package in which modules 42-46 and/or RFD system 40 are housed.

CM module 42 may perform any of the operations attributable to CM module 20, in reverse. That is, CM module 42 may be configured to establish a communication session with ground stations 30 and/or LRUs 10. CM module 42 may utilize any suitable wireless transmission technique to establish the communication session with ground stations 30 and/or LRUs 10. For instance, in some examples CM module 42 includes a Wi-Fi radio that searches for a Wi-Fi network (e.g., at an airport) at which ground stations 30 and/or LRUs 10 are connected.

In some examples, utilizing a pull system, CM module 42 may scan for ground stations 30 and/or LRUs 10 (e.g., after one of aircraft 5 lands) and once CM module 42 detects one of ground stations 30 and/or LRUs, CM module 42 may initiate communication link to receive operational data collected by LRUs 10 during the previous flight(s). In an alternative way, by utilizing a push system, CM module 42 may wait until one of ground stations 30 and/or LRUs 10 initiates a communication link with CM module 42 to begin the transfer of operational data.

LRU data store 48 represents a memory or other information repository at which DP module 44 stores and FP module 46 retrieves operational data collected during flight of aircraft 5 by LRUs 10. For example, LRU data store 48 may preserve the operational data initially stored at operational data store 22 for each of LRUs 10 of system 1. LRU data store 48 may represent an operational flight history of one or all LRUs 10. Using the information stored at LRU data store 48, FP module 46 may perform root cause analysis of a failure at one of LRUs 10 and/or predict potential failures that have not yet occurred with one of LRUs 10.

LRU data store 48 may be a memory, a disk, or other non-volatile, non-transitory, computer-readable storage medium configured to store data before and after LRUs 10 output operational data after aircraft 5 have landed. LRU data store 48 may arrange the operational data based on time, aircraft identifier, LRU identifier, category, or any other logical way to organize operational data for making determinations about current and future faults.

DP module 44 may manage the collection and organization of all the operational data collected by LRUs in the field and cause LRU data store 48 so that FP module 46 can retrieve the stored operational data to predict failures. After any of aircraft 5 have landed, DP module 44 may establish, via CM module 42, a communication link (e.g., either directly or via ground stations 30) with LRUs 10 for receiving operational data collected by LRUs 10 during flight. For example, DP module 44 may establish a communication link with LRU 10A and receive first operational data collected by LRU 10A during flight operations of aircraft 5A and may further establish a communication link with LRU 10B and receive second operational data collected by LRU 10B during flight operations of aircraft 5B.

DP module 44 may cause LRU data store 48 to store the first operational data with an identifier (e.g., serial number) associated with LRU 10A and also store the second operational data with an identifier associated with LRU 10B. By storing the operational data collected by different LRUs 10, DP module 44 may build a respective flight history associated with each of LRUs 10. Collectively, the flight histories associated with each of LRUs 10 may represent a flight history of all the fielded LRUs 10 of a model or family of a particular type of LRU.

FP module 46 may rely on the information stored at LRU data store 48 to predict whether any failure conditions may occur at any of the LRUs 10 and/or determine root cause for observed failures associated with LRUs 10. For example, based on the operational data collected by LRUs 10A and 10B, FP module 46 may predict whether LRU 10A is likely to fail in the future.

FP module 46 may simultaneously process the operational data collected by LRUs 10A and 10B to determine trends in the operational data collected by each. In case that a failure did occur at LRU 10B in the past, FP module 46 can determine whether the operational data collected by LRU 10A at a current time exhibits similar patterns or trends as the data collected by LRU 10B leading up to the past failure.

In some examples, FP module 46 may rely on one or more rules, algorithms, or other suitable techniques for predicting a future failure condition associated with one or more LRUs 10. For example, a machine learning module of FP module 46 may develop a rule based on trends observed or otherwise identified in past operational data collected than can be applied to current operational data being collected to determine whether a future failure condition is likely to occur.

Said another way, FP module 46 may identify trends in the second operation data obtained from LRU 10B. FP module 46 may compare the first operational data collected by LRU 10A to the one or more trends identified in the second operation data obtained from LRU 10B to determine whether a failure condition that happened at LRU 10B is likely to occur at LRU 10A in the future.

In the event that FP module 46 determines a failure condition is likely to occur at one of LRUs 10, FP module 46 may output, via CM module 42, an indication of the failure condition. For example, FP module 46 may cause CM module 42 to output information (e.g., a message, an e-mail, a report, or other types of data) to ground stations 30 that ground stations 30 may present to ground personnel, so that any of the effected LRUs 10 can receive proper maintenance or replacement to prevent the failure condition from actually occurring.

By wirelessly linking LRUs 10, via ground stations 30, to RFD system 40 may provide an operational flight history of each and every LRUs 10. The operational flight history can be maintained by RFD system 40 to enable LRU faults to better be predicted, and so that preventive action can be recommended, before a major failure of an LRU occurs. As such the availability and reliability of each of LRUs 10 may increase.

Furthermore, the flight history and operational data may be used by other systems, for example, to aid in the development and improvement of internal, built-in-test (BIT) functionality and systems of each of LRUs 10. For example, a manufacturer of LRU 10A may update BIT module 16 so that LRU 10A will automatically recognize a particular failure in the future.

Figure 5:
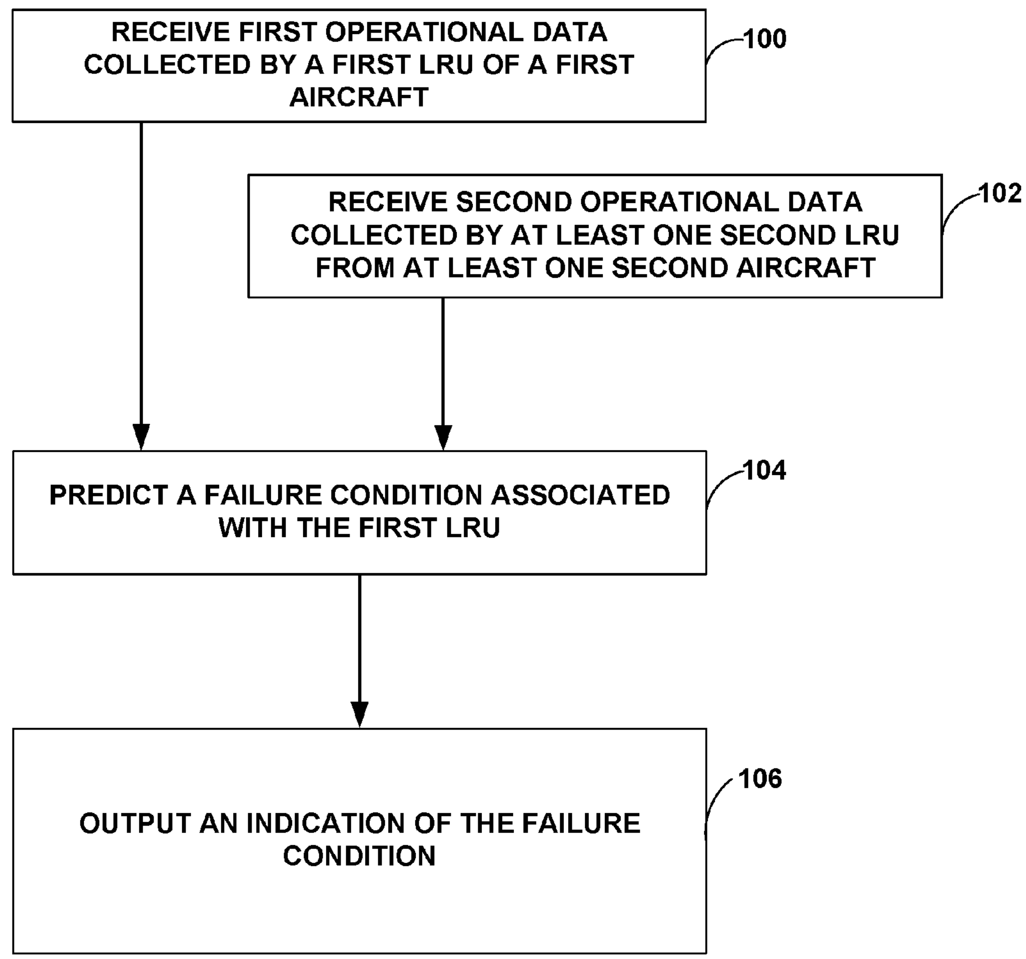
FIG. 5 is a flow chart illustrating example operations of the example remote fault prediction system that is configured to predict failure conditions based on operational data collected by the example one or more example line-replaceable-units, in accordance with one or more aspects of the present disclosure.

FIG. 5 is a flow chart illustrating example operations of the example remote computing system that is configured to predict failure conditions based on operational data collected by one or more line-replaceable-units, in accordance with one or more aspects of the present disclosure. The operations of FIG. 3 may be performed by modules 42-46 of RFD system 40 and are described below in the context of system 1 of FIG. 1, LRU 10A of FIG. 2, and RFD system 40 of FIG. 3.

In operation, RFD system 40 may receive first operational data collected by LRU 10A of aircraft 5A (100). For example, ground station 30A may establish a communication link with LRU 10A after detecting the presence of LRU 10A on an airport network. The presence of LRU 10A being on the same airport network that ground station 30A is connected may indicate to ground station 30A that not only has aircraft 5A landed, but also that LRU 10A may have stored operational data ready for retrieval. Ground station 30A may retrieve the operational data collected by LRU 10A and relay the operational date to RFD system 40.

Before, while, or after receiving the first operational data, RFD system 40 may receive second operational data collected by LRU 10B of aircraft 5B (102). For example, ground station 30B may establish a communication link with LRU 10B after detecting the presence of LRU 10B on an airport network. Ground station 30B may retrieve the operational data collected by LRU 10B and relay the operational date to RFD system 40.

Based on the first operational data received from LRU 10A, and further based on the second operational data received from LRU 10B, RFD system 40 may predict a failure condition associated with LRU 10A (104). In other words, RFD system 40 may build a flight history associated with one or more LRUs 10 and based on post flight analysis of the flight histories, determine root cause analysis and make predictions about potential upcoming failures in the fleet. RFD system 40 may determine that a failure condition at LRU 10A is likely to occur in the near-future, even though the operational data from LRU 10A alone, and/or observed performance of LRU 10A, may not indicate that LRU 10A is about to fail.

RFD system 40 may output an indication of the failure condition (106). For instance, after determining that LRU 10A is about to fail or is likely to fail, RFD system 40 may send ground station 30A a list of maintenance checks or suggested operations to be performed on LRU 10A to prevent any failure. In some examples, RFD system 40 may output the information as a service bulletin received by various airlines or customers that fly and maintain aircraft 5. In some examples, RFD system 40 may be connected with an inventory or parts management system so that additional, replacement LRUs 10 can be ordered and sent to the location of LRU 10A to be replaced.

By wirelessly linking LRUs 10 (e.g., via ground stations 30) to RFD system 40, system 1 may provide an operational flight history of all previously and presently fielded LRUs 10. The operational flight history can be maintained by RFD system 40 to enable maintenance personnel, manufacturers, as well as automated BIT systems to predict faults and take preventive action to prevent faults from occurring. As such the availability and reliability of each of LRUs 10 may increase.

Clause 1. A method for determining failure conditions associated with aircraft installed line-replaceable-units, the method comprising: receiving, by a remote computing system, first operational data collected by a first line-replaceable-unit of a first aircraft during flight operations of the first aircraft; receiving, by the remote computing system, second operational data collected by at least one second line-replaceable-unit of at least one second aircraft during flight operations of the at least one second aircraft; predicting, by the remote computing system, based at least in part on the first operational data and the second operational data, a failure condition associated with the first line-replaceable-unit of the first aircraft; and outputting, by the remote computing system, an indication of the failure condition.

Clause 2. The method of clause 1, further comprising: determining, by the remote computing system, a preventative action associated with the first line-replaceable-unit for preventing the failure condition; and outputting, by the remote computing system, an indication of the preventative action.

Clause 3. The method of any of clauses 1-2, wherein the first operational data is received wirelessly via a communication link established directly with the first line-replaceable-unit of the first aircraft.

Clause 4. The method of clause 3, wherein the first operational data is received wirelessly via a communication link established between the first line-replaceable-unit of the first aircraft and the remote computing system after the first aircraft has landed.

Clause 5. The method of any of clauses 3-4, wherein the first operational data is received wirelessly via a communication link established between the first line-replaceable-unit of the first aircraft and a ground station of the remote computing system.

Clause 6. The method of any of clauses 1-5, wherein the first operational data comprises one or more operational parameters being monitored by a built-in-test module of the first line-replaceable-unit.

Clause 7. The method of any of clauses 1-6, wherein predicting the failure condition comprises: identifying, by the remote computing system, one or more trends in the second operational data that caused an operational failure of the second line-replaceable-unit; and comparing, by the remote computing system, the first operational data to the one or more trends to determine whether the failure condition associated with the first line-replaceable-unit is likely to occur.

Clause 8. A remote computing system for determining failure conditions associated with aircraft installed line-replaceable-units, the remote computing system comprising: at least one processor; and at least one module operable by the at least one processor to: receive first operational data collected by a first line-replaceable-unit, installed onboard a first aircraft, during flight operations of the first aircraft; receive second operational data collected by at least one second line-replaceable-unit, installed onboard at least one second aircraft, during flight operations of the at least one second aircraft; predict, based at least in part on the first operational data and the second operational data, a failure condition associated with the first line-replaceable-unit; and output, an indication of the failure condition.

Clause 9. The remote computing system of clause 8, wherein the at least one module is further operable by the at least one processor to: determine a preventative action associated with the first line-replaceable-unit for preventing the failure condition; and output an indication of the preventative action.

Clause 10. The remote computing system of any of clauses 8-9, wherein the at least one module is further operable by the at least one processor to receive the first operational data collected by the first line-replaceable-unit during flight via a wireless communication link established between the first line-replaceable-unit, the remote computing system, and an airport network.

Clause 11. The remote computing system of any of clauses 8-10, wherein the remote computing device comprises a ground station configured to send the first and second operational data for analysis by a remote fault detection system, wherein at least one module operable by the at least one processor to predict the failure condition by at least receiving information from the remote fault detection system that is indicative of the failure condition.

Clause 12. The remote computing system of any of clauses 8-11, wherein the at least one module operable by the at least one processor to output the indication of the failure condition for display at a graphical user interface associated with the remote computing system.

Clause 13. A line-replaceable-unit configured for installation in an aircraft comprising: at least one processor; and at least one module operable by the at least one processor to: during flight operations of the aircraft, automatically collect operational data associated with the line-replaceable-unit; responsive to determining that the aircraft has landed, automatically establish a communication session with a ground station; and automatically output, to a ground station, the operational data via the communication session for subsequent transmission to a remote computing system configured to predict, based on the operational data, one or more failure conditions associated with the line-replaceable-unit.

Clause 14. The line-replaceable-unit of clause 13, further comprising a memory, wherein the at least one module is further operable by the at least one processor to: detect a value of an operational parameter associated with the line-replaceable-unit; and store, at the memory, as the operational data being collected during flight operations of the aircraft, the value of the operational parameter.

Clause 15. The line-replaceable-unit of any of clauses 13-14, wherein the line-replaceable-unit comprises at least one of a radar system, an onboard computer system, a terrain and traffic collision avoidance system, a communication radio, an engine, an engine controller, a flight management system, a radio altimeter, a navigation system, or a flight warning computer.

Clause 16. The line-replaceable-unit of any of clauses 13-15, wherein the operational data associated with the line-replaceable-unit comprises an indication of at least one of: voltage or current level information; temperature information; motor speed information; engine thrust information; acceleration information; barometric pressure information; transmission power information; audio level information; humidity level information; or single event upsets information.

Clause 17. The line-replaceable-unit of any of clauses 13-16, wherein the at least one module is further operable by the at least one processor to automatically collect the operational data by at least: detecting one or more single event upsets; and storing, at a memory of the line-replaceable-unit, information associated with the one or more single event upsets.

Clause 18. The line-replaceable-unit of clause 17, wherein the information associated with the one or more single event upsets comprises at least one of: a time of each, or a range of times, of the one or more single event upsets; a quantity of the one or more single event upsets; and an indication of whether each, or any, of the one or more single events upsets triggered a recoverable or non-recoverable memory error associated with a memory of the line-replaceable-unit.

Clause 19. The line-replaceable-unit of any of clauses 13-18, wherein the at least one module is further operable by the at least one processor to automatically collect the operational data by at least: detecting an input voltage or current level associated with the line-replaceable-unit; and storing as the operational data associated with the line-replaceable-unit, information associated with the input voltage or current level.

Clause 20. The line-replaceable-unit of clause 19, wherein the at least one module is further operable by the at least one processor to detect the input voltage or current level associated with the line-replaceable-unit further by at least: determining whether the input voltage or current level satisfies a threshold level for an acceptable input voltage or current level; and responsive to determining that the input voltage or current level does not satisfy the threshold level, storing, at a memory of the line-replaceable-unit, an indication of when and by how much the input voltage or current level deviated from the threshold level.

Clause 21. The system of any of clauses 8-12, wherein the at least one module is further operable by the at least one processor to perform any of the methods of clauses 1-7.

Clause 22. A non-transitory computer-readable storage medium comprising instructions that, when executed by at least one processor of a remote fault detection system, configure the remote fault detection system to perform any of the methods of clauses 1-7.

In one or more examples, the operations described may be implemented in hardware, software, firmware, or any combination thereof. If implemented in software, the operations may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method for determining failure conditions associated with aircraft installed line-replaceable-units, the method comprising:

receiving, by a remote computing system, first operational data collected by a first line-replaceable-unit of a first aircraft during flight operations of the first aircraft;

receiving, by the remote computing system, second operational data collected by at least one second line-replaceable-unit of at least one second aircraft during flight operations of the at least one second aircraft;

predicting, by the remote computing system, based at least in part on the first operational data and the second operational data, a failure condition associated with the first line-replaceable-unit of the first aircraft; and outputting, by the remote computing system, an indication of the failure condition.

2. The method of claim 1, further comprising:

determining, by the remote computing system, a preventative action associated with the first line-replaceable-unit for preventing the failure condition; and outputting, by the remote computing system, an indication of the preventative action.

3. The method of claim 1, wherein the first operational data is received wirelessly via a communication link established directly with the first line-replaceable-unit of the first aircraft.

4. The method of claim 3, wherein the first operational data is received wirelessly via a communication link established between the first line-replaceable-unit of the first aircraft and the remote computing system after the first aircraft has landed.

5. The method of claim 3, wherein the first operational data is received wirelessly via a communication link established between the first line-replaceable-unit of the first aircraft and a ground station of the remote computing system.

6. The method of claim 1, wherein the first operational data comprises one or more operational parameters being monitored by a built-in-test module of the first line-replaceable-unit.

7. The method of claim 1, wherein predicting the failure condition comprises:

identifying, by the remote computing system, one or more trends in the second operational data that caused an operational failure of the second line-replaceable-unit; and comparing, by the remote computing system, the first operational data to the one or more trends to determine whether the failure condition associated with the first line-replaceable-unit is likely to occur.

8. The method of claim 1, wherein the first operational data includes information associated with one or more single event upsets detected by the first line-replaceable unit during the flight operations of the first aircraft, and wherein the second operational data includes information associated with one or more single event upsets detected by the second line-replaceable unit during the flight operations of the second aircraft.

9. A remote computing system for determining failure conditions associated with aircraft installed line-replaceable-units, the remote computing system comprising:

at least one processor; and at least one module operable by the at least one processor to:

receive first operational data collected by a first line-replaceable-unit, installed onboard a first aircraft, during flight operations of the first aircraft;

receive second operational data collected by at least one second line-replaceable-unit, installed onboard at least one second aircraft, during flight operations of the at least one second aircraft;

predict, based at least in part on the first operational data and the second operational data, a failure condition associated with the first line-replaceable-unit; and output, an indication of the failure condition.

10. The remote computing system of claim 9, wherein the at least one module is further operable by the at least one processor to:

determine a preventative action associated with the first line-replaceable-unit for preventing the failure condition; and output an indication of the preventative action.

11. The remote computing system of claim 9, wherein the at least one module is further operable by the at least one processor to receive the first operational data collected by the first line-replaceable-unit during flight via a wireless communication link established between the first line-replaceable-unit, the remote computing system, and an airport network.

12. The remote computing system of claim 9, wherein the remote computing device comprises a ground station configured to send the first and second operational data for analysis by a remote fault detection system, wherein at least one module operable by the at least one processor to predict the failure condition by at least receiving information from the remote fault detection system that is indicative of the failure condition.

13. The remote computing system of claim 9, wherein the at least one module operable by the at least one processor to output the indication of the failure condition for display at a graphical user interface associated with the remote computing system.

14. The remote computing system of claim 9, wherein the first operational data includes information associated with one or more single event upsets detected by the first line-replaceable unit during the flight operations of the first aircraft, and wherein the second operational data includes information associated with one or more single event upsets detected by the second line-replaceable unit during the flight operations of the second aircraft.

15. A remote computing system for determining failure conditions associated with aircraft installed line-replaceable-units, the remote computing system comprising:

means for receiving first operational data collected by a first line-replaceable-unit of a first aircraft during flight operations of the first aircraft, the first operational data including information associated with one or more single event upsets detected by the first line-replaceable unit during the flight operations of the first aircraft;

means for receiving second operational data collected by at least one second line-replaceable-unit of at least one second aircraft during flight operations of the at least one second aircraft, the second operational data including information associated with one or more single event upsets detected by the second line-replaceable unit during the flight operations of the second aircraft;

means for predicting, based at least in part on the first operational data and the second operational data, a failure condition associated with the first line-replaceable-unit of the first aircraft; and means for outputting an indication of the failure condition.

16. The remote computing system of claim 15, further comprising:

means for determining a preventative action associated with the first line-replaceable-unit for preventing the failure condition; and means for outputting an indication of the preventative action.

17. The remote computing system of claim 15, wherein the means for receiving the first operational data comprises means for receiving the first operational data wirelessly via a communication link established directly with the first line-replaceable-unit of the first aircraft.

18. The remote computing system of claim 17, wherein the means for receiving the first operational data comprises means for receiving the first operational data wirelessly via a communication link established between the first line-replaceable-unit of the first aircraft and the remote computing system after the first aircraft has landed.

19. The remote computing system of claim 17, wherein the means for receiving the first operational data comprises means for receiving the first operational data wirelessly via a communication link established between the first line-replaceable-unit of the first aircraft and a ground station of the remote computing system.

20. The remote computing system of claim 15, wherein the first operational data includes information associated with one or more single event upsets detected by the first line-replaceable unit during the flight operations of the first aircraft, and wherein the second operational data includes information associated with one or more single event upsets detected by the second line-replaceable unit during the flight operations of the second aircraft.

* * * * *